United States Patent
Matula et al.

(10) Patent No.: US 9,094,420 B2
(45) Date of Patent: Jul. 28, 2015

(54) SYSTEM AND METHOD FOR ASSURING QUALITY REAL-TIME COMMUNICATION EXPERIENCE IN VIRTUAL MACHINE

(75) Inventors: Valentine C. Matula, Granville, OH (US); George W. Erhart, Loveland, CO (US); David J. Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 503 days.

(21) Appl. No.: 13/351,301

(22) Filed: Jan. 17, 2012

(65) Prior Publication Data

US 2012/0218374 A1 Aug. 30, 2012

Related U.S. Application Data

(60) Provisional application No. 61/446,498, filed on Feb. 24, 2011.

(51) Int. Cl.
*H04N 7/14* (2006.01)
*H04L 29/06* (2006.01)
*H04M 7/00* (2006.01)

(52) U.S. Cl.
CPC ........ *H04L 65/1069* (2013.01); *H04L 65/1006* (2013.01); *H04M 7/006* (2013.01)

(58) Field of Classification Search
USPC .................. 370/352, 466; 709/204, 205, 224, 709/227–228; 379/201.12, 93.01; 348/14.12
See application file for complete search history.

(56) References Cited

U.S. PATENT DOCUMENTS

| | | | | |
|---|---|---|---|---|
| 7,107,312 B2 * | 9/2006 | Hackbarth et al. | ............ | 709/204 |
| 7,299,257 B2 * | 11/2007 | Boyer et al. | ................ | 709/204 |
| 7,571,235 B2 * | 8/2009 | O'Rourke et al. | ............ | 709/228 |
| 8,676,195 B2 * | 3/2014 | Zhang et al. | ................ | 455/433 |
| 2005/0078705 A1 * | 4/2005 | Ito | ................ | 370/466 |
| 2005/0094621 A1 * | 5/2005 | Acharya et al. | ............... | 370/352 |
| 2007/0201409 A1 * | 8/2007 | Kandlur et al. | ............... | 370/338 |
| 2008/0186955 A1 * | 8/2008 | Puckett | ........................ | 370/352 |
| 2008/0192732 A1 * | 8/2008 | Riley et al. | ................... | 370/352 |
| 2013/0163580 A1 * | 6/2013 | Vass | .............................. | 370/352 |

* cited by examiner

*Primary Examiner* — Olisa Anwah
(74) *Attorney, Agent, or Firm* — Maldjian Law Group LLC; John Maldjian; William J. Connelly, III

(57) ABSTRACT

Method to provide SIP session management of a real-time communication to a softphone client in a virtual machine, including: accepting an invitation to join a SIP session; receiving, by a server-based softphone in the SIP session, a real-time communication that is encoded with at least one SIP session aspect; transmitting the real-time communication and the at least one SIP session aspect to a client-based softphone; and using the at least one SIP session aspect for SIP session management.

22 Claims, 4 Drawing Sheets

Public registration, media relay

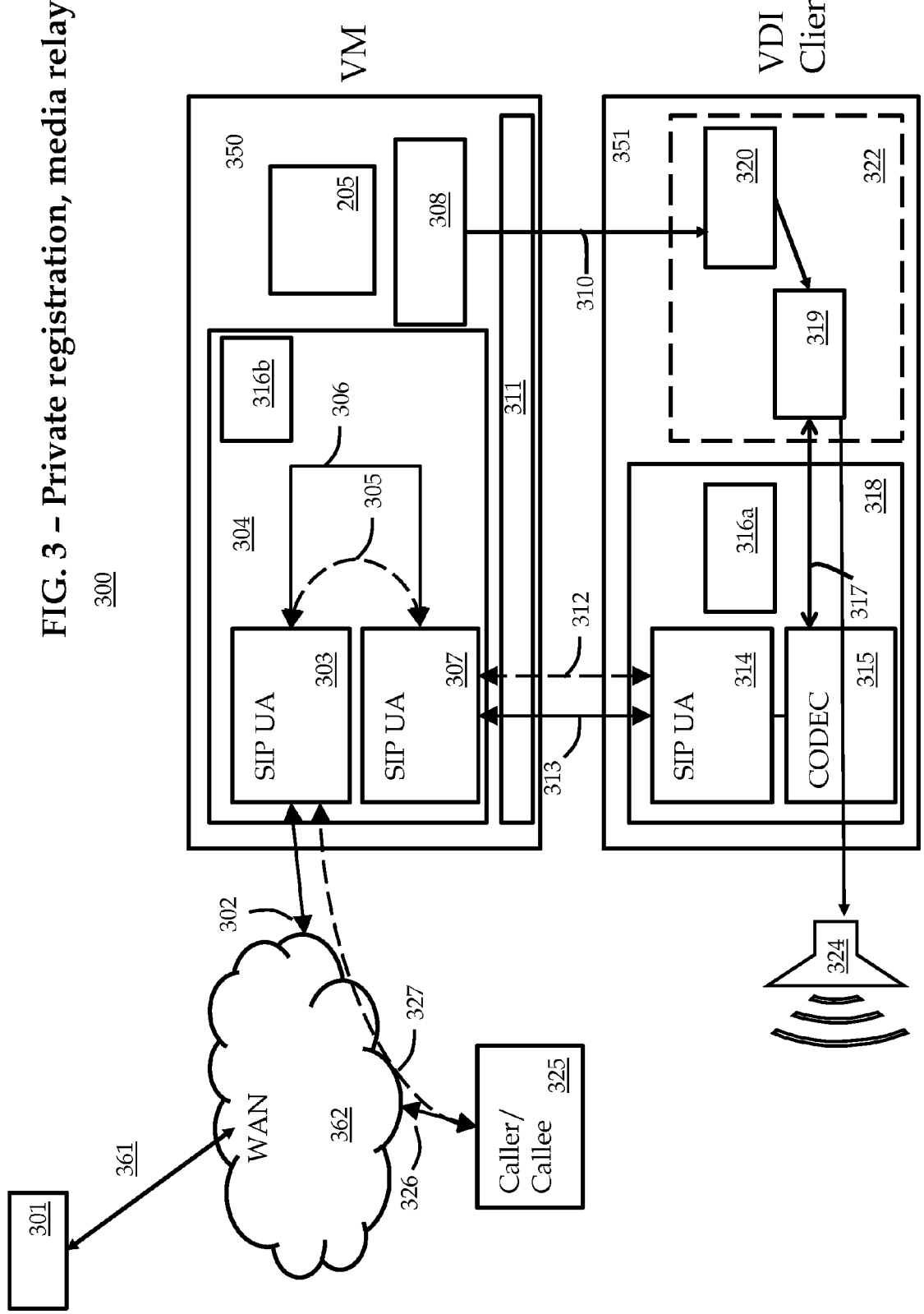

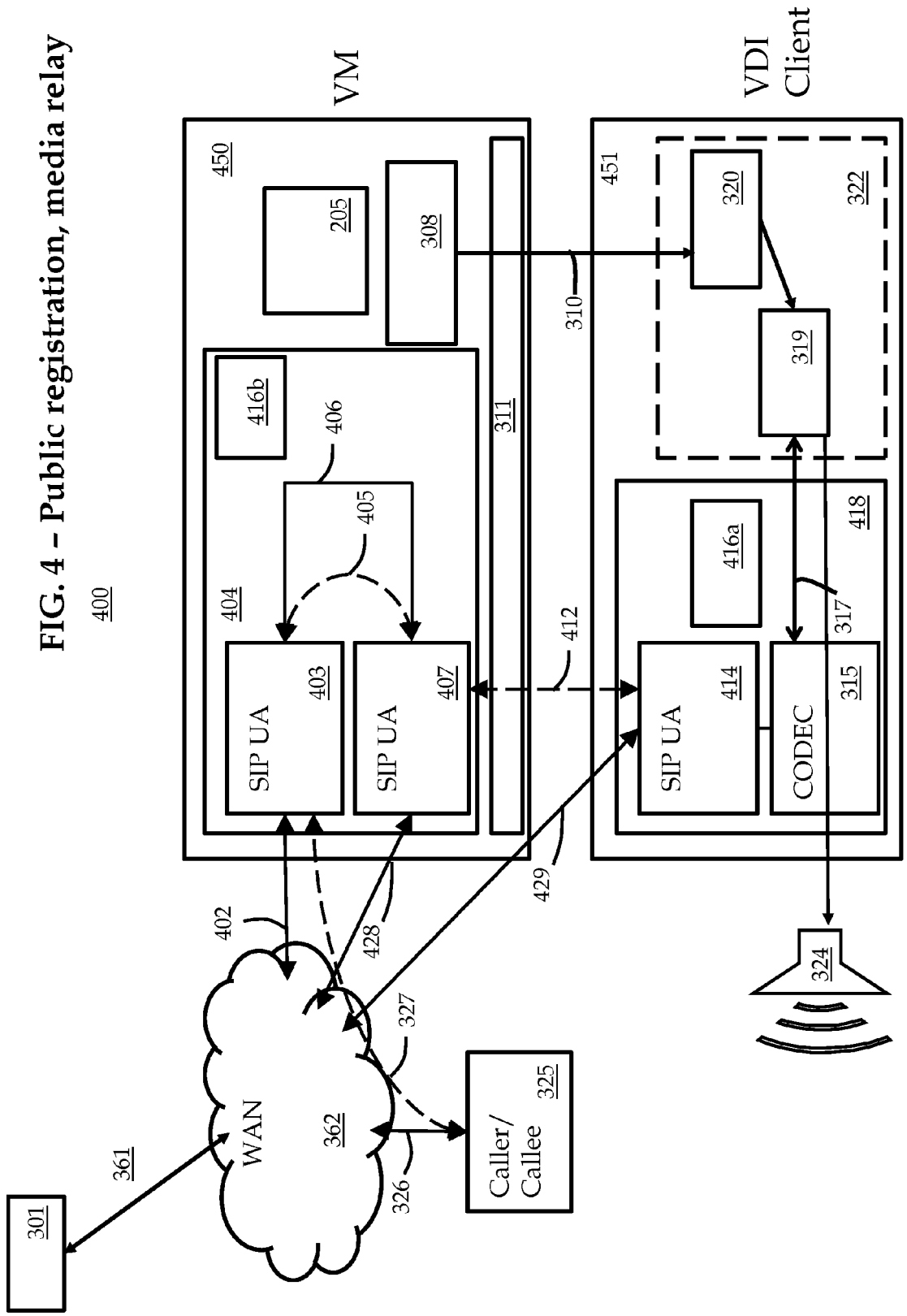
FIG. 4 – Public registration, media relay
400

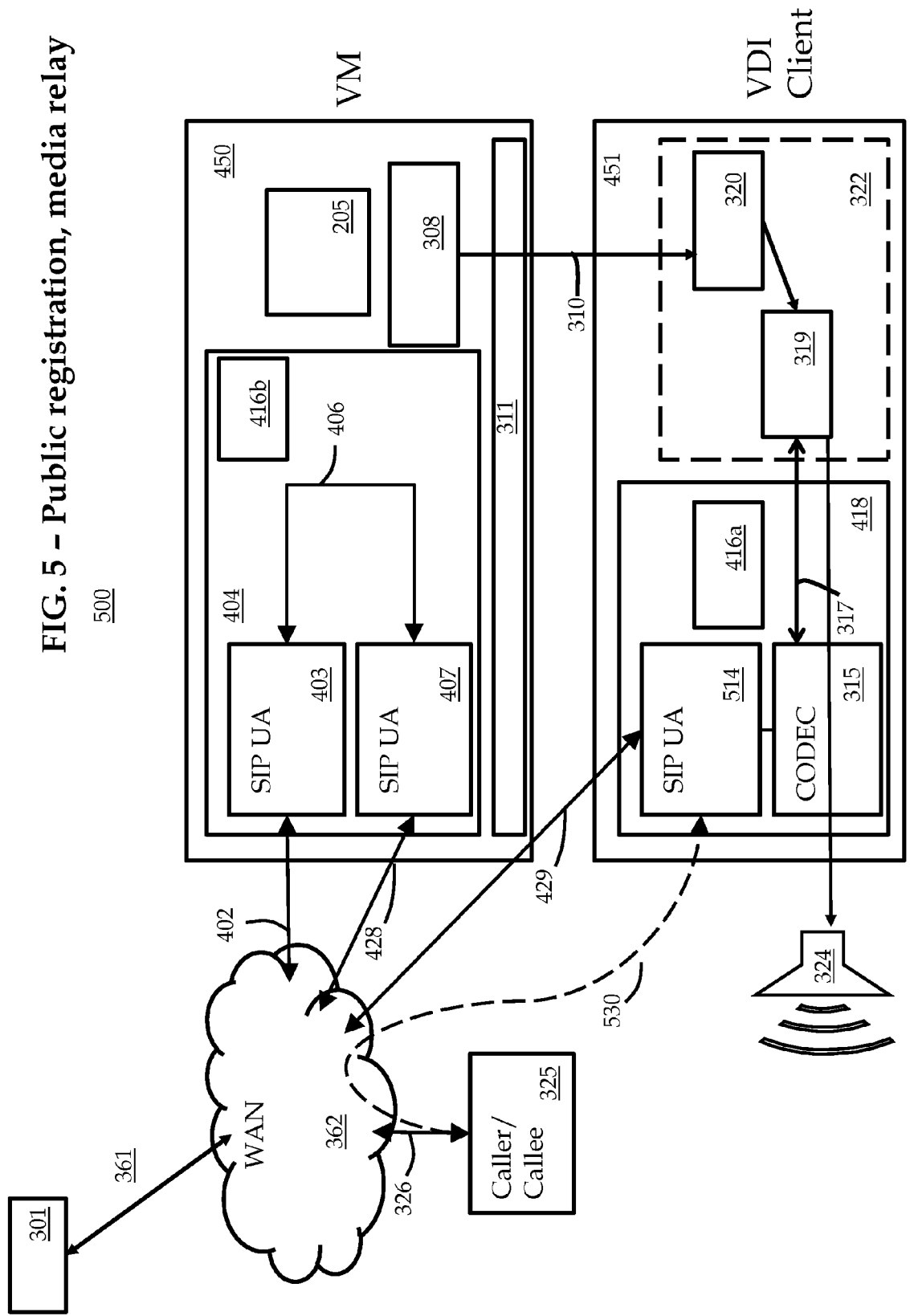
FIG. 5 – Public registration, media relay

SYSTEM AND METHOD FOR ASSURING QUALITY REAL-TIME COMMUNICATION EXPERIENCE IN VIRTUAL MACHINE

CROSS-REFERENCE TO RELATED APPLICATIONS

This application claims the benefit of U.S. Provisional Patent Application Ser. No. 61/446,498, filed on Feb. 24, 2011, the content of which is hereby incorporated by reference in its entirety.

BACKGROUND

1. Field of the Invention

Embodiments of the present invention generally relate to virtual desktop infrastructure/integration (VDI) softphone architecture. More specifically, embodiments of the present invention relate to a system and method for assuring quality real-time communication experience in a virtual machine.

2. Description of the Related Art

When a virtual machine is deployed in a data center, a thin client uses a remote desktop protocol to access the virtual machine. A softphone computer program can be deployed on such a virtual machine, and configured to provide a user control interface, as well as terminate incoming voice and video streams, and generate outgoing voice and video streams. Local virtual device drivers in the virtual machine are used to render incoming audio and video, and to capture the outgoing audio and video. The remote desktop protocol provides the transfer of voice and video data between the virtual machine and the thin client system that sits with the employee using the desktop. Improvements in this protocol can speed the transmission of real-time voice and video between the virtual machine and the thin client. However, because the voice & video is "terminated" in the softphone, rendered, and then replicated using other protocols to the thin client, valuable capabilities are lost or degraded. For example, QOS, VLAN marking, and visibility from centralized Session Initiation Protocol (SIP) management systems out to the user's endpoint device are examples of session parameters that are lost or significantly degraded. Furthermore, by rendering the voice and video, the resulting data stream may be much larger (due to less compression), and be degraded in quality due to rendering and recomposing for transmission from the virtual machine to the thin client.

Known simple media acceleration techniques in the market do not differentiate video traffic for viewing from video traffic associated with live calling. For example, Citrix has attempted to speed the transmission between the client and the VM using the HDX family of protocol improvements. VMware has similar improvements underway for generic real time media transmission. Commercial practice is to write better virtual device drivers, or to redirect downstream multimedia content for viewing to the client device. However, current systems and methods terminate the SIP session, and replace it with a protocol that inherently does not support QOS/VLAN/visibility to real-time communications systems.

Thus, there is a need for a system and method for assuring quality real-time communication experience in a virtual machine, which is capable of separating voice and video traffic simply and efficiently.

SUMMARY

An embodiment of the present invention comprises a system and method for creating a SIP back-to-back (B2B) capability in a VM system as part of a softphone, wherein SIP would be preferably used as the protocol for control and transmission of RT media between the virtual device driver in the VM session and the client system in order to preserve the benefits of end-to-end visibility for SIP.

Embodiments of the present invention further relate to replacing the VM-client protocol with full SIP signaling. Voice and video media streams from other parties or systems can either be relayed without any rendering or changes via a back-to-back (B2B) process through the VM, or they can be routed around the VM (sometimes referred to as "media shuffling") directly to a VDI Client as the final endpoint. Since the VM is not rendering, manipulating, or otherwise changing the media stream contents, there is no loss of captured signal quality if the media is relayed via the B2B or shuffled—but the VM machine does get an improvement in efficiency if it does not have to relay the real time media streams. Even if the media is shuffled, the SIP signaling for call control is still sent to the softphone program executing in the VM, with required thin client control then sent via a second SIP session to the VDI thin client. In accordance with embodiments of the present invention, by using SIP and native telephone real time media formatted streams all the way to the VDI Client, session aspects such as QoS, VLAN, and visibility are not lost and instead are available to the endpoint. Unlike the remote desktop client protocol, allocation of bandwidth between the VM and the VDI client when done with SIP signaling is under the control of a Session Manager, providing assurance that adequate bandwidth will be available for use. Click-to-call capabilities are preserved within the VM, along with Microsoft Office Integration, and the like, but either a relayed or shuffled media path is set up for the RTP streams.

An advantage is that in either case (relayed media or shuffled media), no media decoding/re-encoding is necessarily performed by the VM machine. Furthermore, with full SIP signaling preserved to the endpoint, media renegotiations, quality monitoring, and bandwidth control is all capable of being performed within the telephony "virtual network" if implemented instead of being cross carried in the data media VLAN. Furthermore, by using SIP as the basis for RT media flows between the VM and the client, QoS/VLAN/visibility are preserved. The system and method extends all the way to the final endpoint existing network SIP diagnostic tools. Bandwidth management for real time transmission from the data center to clients now comes under the control of the access control server, such as, for example, the Avaya Session Manager, because the extended SIP leg from VM machine to client would be also done using standard SIP signaling.

In accordance with another embodiment of the present invention, SIP can forward location information for 911/emergency response purposes. If location services are provided by the endpoint virtual client softphone, this information will be properly forwarded by the B2B as well. Thus, automated 911 find-the-phone service based on endpoint-router registration or WiFi triangulation would be available to central emergency services as well.

In one embodiment, all signaling and media traffic will be naturally placed on the correct VLAN in corporations that establishes communications VLAN separate from their data VLAN.

In one embodiment of the present invention, there is provided a method to provide SIP session management of a real-time communication to a softphone client in a virtual machine, including: accepting an invitation to join a SIP session; receiving, by a server-based softphone in the SIP session, a real-time communication that is encoded with at least one SIP session parameter; transmitting the real-time communication and the at least one SIP session parameter to a client-based softphone; and using the at least one SIP session parameter for SIP session management.

In one embodiment of the present invention, there is provided a system to provide SIP session management of a real-time communication to a softphone client in a virtual machine, comprising: a receiver configured to accept an invitation to join a SIP session; a server-based softphone in the SIP session configured to receive a real-time communication that is encoded with at least one SIP session parameter; a transmitter configured to transmit the real-time communication and the at least one SIP session parameter to a client-based softphone; and a session manager configured to use the at least one SIP session parameter for SIP session management.

In one embodiment of the present invention, there is provided a system to provide SIP session management of a real-time communication to a softphone client in a virtual machine, comprising: a processor; a memory coupled to the processor, the memory configured to store software that, when executed by the processor, performs the steps of: accepting an invitation to join a SIP session; receiving, by a server-based softphone in the SIP session, a real-time communication that is encoded with at least one SIP session parameter; transmitting the real-time communication and the at least one SIP session parameter to a client-based softphone; and using the at least one SIP session parameter for SIP session management.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein:

FIG. 3 depicts a simplified block diagram of a virtual machine-client SIP via private registration, with media relayed through a virtual machine in accordance with an embodiment of the present invention;

FIG. 4 depicts a simplified block diagram of a virtual machine-client SIP via public registration, with media relayed through a virtual machine in accordance with an embodiment of the present invention; and FIG. 5 depicts a simplified block diagram of a virtual machine-client SIP public registration, with direct media communication to/from a softphone, in accordance with an embodiment of the present invention.

Figure 2:
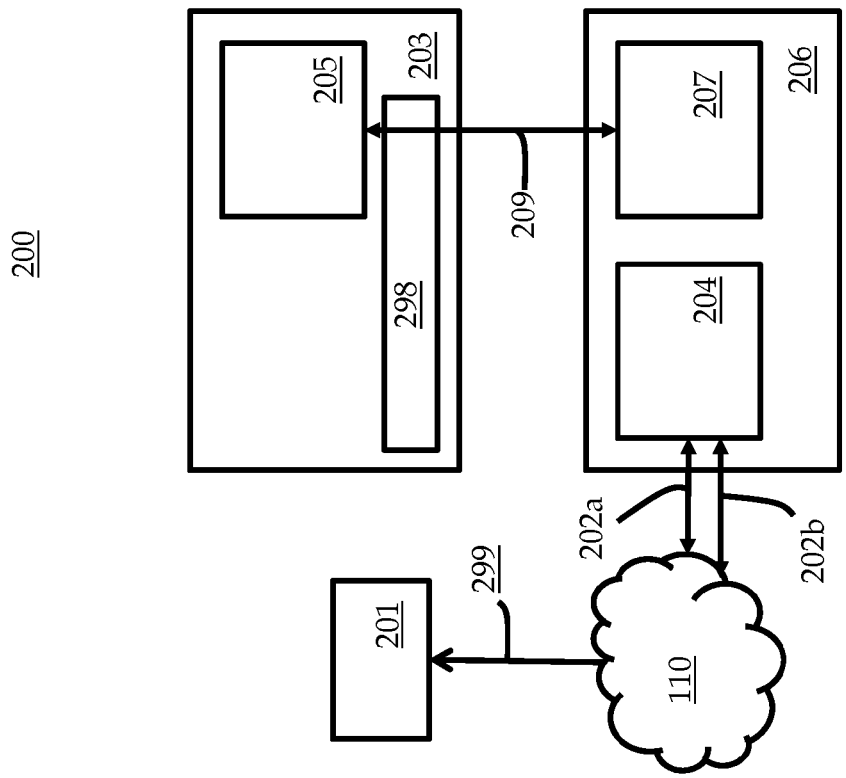
FIG. 2 depicts a simplified block diagram of a softphone in VDI client endpoint.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A virtual machine ("VM") is a software implementation of a machine (i.e. a computer) that executes programs like a physical machine. Underlying physical machine resources may be shared with strong isolation among VMs. The VM may be implemented in a client-server architecture. The client is typically a thin client (sometimes also called a lean or slim client), but the client may also be a fat client. The thin client is a computer or a computer program which depends heavily on some other computer (i.e., the server) to fulfill its traditional computational roles. In contrast, a fat client is a computer designed to take on traditional computational roles by itself. Thin clients may be components of a broader computer infrastructure, where many clients share their computations with the same server. An example of a thin client is a low-end computer terminal or a handheld mobile device which concentrates primarily on providing a graphical user interface to the end-user.

The roles assumed by the virtual machine server may vary, from providing data persistence (for example, for diskless nodes) to actual information processing on the client's behalf. The remaining functionality, in particular the operating system, is provided by the VM server.

Figure 1:
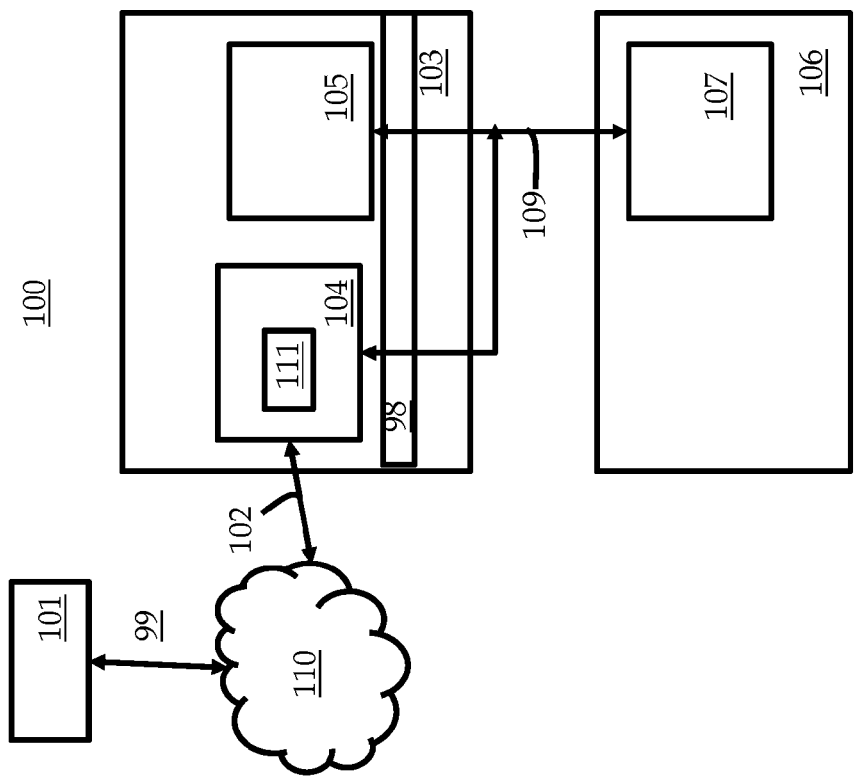
FIG. 1 depicts a simplified block diagram of a VDI-softphone industry architecture overview.

FIG. 1 illustrates a communication architecture 100 for providing real-time voice and real-time video (or, simply, real-time voice and video) through a virtual machine ("VM") server 103. Communication channel 102 links a network 110 (the Internet or other WAN) to virtual machine server 103. IT application module 98 manages virtual machine server 103. A SIP-based communication control system 101 is linked via communication channel 99 to network 110 as well. System 101 may be, for instance, an Avaya Aura™ Session Manager. Communication channel 102 may carry the real-time voice and video media stream under the direction and control of signals that conform to Session Initiation Protocol ("SIP"), also known as RFC 3261. The media stream(s) are communicated using a Real-time Transport Protocol ("RTP"), also known as RFC 3550 (formerly RFC 1889), for transporting real-time data and providing Quality of Service ("QoS") feedback.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users.

However, the basic functionality and operation of SIP does not depend on any of these protocols.

Virtual machine server 103 may include one or more IT application module(s) 105 and at least one softphone module 104 (described below in further detail). Operating system functions of VM server 103 are performed by IT application module 98. Communication architecture 100 further includes VDI client endpoints 106. Within VDI client endpoints 106 is at least one thin and/or fat client, illustrated in FIG. 1 as VDI thin client 107. Communication channel 109 links IT application module 105 to the operating system 98, which in turn provides communication capability with at least one VDI thin client 107.

The real-time voice and video is processed in VM server 103, in particular it is processed within softphone module 104. Softphone module 104 is a module that is used for making telephone calls over the Internet using, e.g., a general purpose computer or other non-dedicated computing platform, rather than using dedicated telephone hardware. Softphone module 104 includes a voice and video controller 111 to process the received voice and video data through a codec to decode the received voice and video data, or to encode voice signals into voice data and video camera input into video data for transmission through interface 101. Voice and video controller 111 may also process the voice and video data for retransmission to VDI thin client 107.

To communicate, both end-points of the telephone call must have the same communication protocol and at least one common audio codec. Softphone module 104 may have standard telephony features (e.g., DND, Mute, DTMF, Flash, Hold, Transfer, etc.) and may also have additional features typical for online messaging, such as user presence indication, video, wide-band audio. Softphone module 104 may utilize a variety of audio codecs, including G.711 and G.729, as well as video codecs such as H.263, H.263-1998, and H.264-AVC and H.264-SVC.

Softphone module 104 terminates the SIP and RTP protocols used to transport the real-time voice and video incoming arriving on communication channel 102. The real-time voice and video is then transported to VDI thin client 107 over communication channel 109. Because of the real-time nature of the signals, a user of VDI thin client 107 may experience jitter, frame freezes, or other bandwidth-related degradations in video and/or audio available at the VDI client endpoint 106, unless communication channel 109 is designed with care in order to ensure the availability of bandwidth capacity, or that the signal coding and/or protocol used with communication channel 109 is designed with care to reduce the bandwidth required for a predetermined level of quality. In addition, jitter and frame freezes can also be caused by insufficient processing capacity for use by softphone application 104. Furthermore, IT application modules 105 may also suffer degraded performance if a greater proportion of CPU cycles of VM server 103 are devoted to processing the real-time video and voice. Communication channel 109 typically is designed using proprietary protocols in order to speed up the delivery of real-time voice and video from VM server 103 to VDI thin client 107. For instance, one example of a proprietary protocol used for this purpose is HDX™ family of protocol improvements by Citrix. However, this does not address the issue of insufficient or timely compute capability being provided to softphone application 104.

Because the SIP and RTP protocols are terminated in softphone module 104, the features and benefits specific to SIP and RTP are no longer available to any further retransmission of the real-time voice and video. Valuable capabilities available through the SIP and/or RTP protocols are lost or degraded. For example, QoS, VLAN marking, and visibility from centralized SIP management systems out to the user's endpoint device are examples of session parameters that are lost or significantly degraded.

FIG. 2 illustrates an alternative communication architecture 200 for providing real-time voice and video. Communication channels 202a, 202b link a network 110 (the Internet or other WAN) to softphone 204, which is located within VDI client endpoints 206. A SIP-based communication control system 201 is linked via communication channel 299 to network 110 as well. System 201 may be, for instance, the Avaya Aura™ Session Manager. VDI client endpoints 206 may further include at least one thin and/or fat client, illustrated in FIG. 2 as VDI thin client 207. Communication channel 202a may carry signaling that conforms to SIP (RFC 3261), and communication channel 202b may carry the real-time voice, video and QoS feedback using signals that conform to (RFC 3550 (formerly RFC 1889)).

Communication architecture 200 further includes a virtual machine server 203 and at least one IT application module 205. Operating system functions of virtual machine server 203 are performed by IT application module 298. Operating system functions of VM server 203 are performed by IT application module 205. Communication channel 209 links IT application module 205 to the IT application module 298, which in turn provides communication capability with at least one VDI thin client 207.

Softphone module 204 is located within VDI client endpoints 206, thereby eliminating a need for a communications channel to carry the real-time voice and video between VM server 203 and VDI client endpoints 206. Locating softphone module 204 in VDI client endpoints 206 also eliminates communication bottlenecks and/or degradations if the real-time voice and video had been terminated in the VM server 203 without the ability to extend benefits of the SIP and RTP protocols to the VDI client endpoints 206. A disadvantage of communication architecture 200 is that VM server 203 and IT application module 205 are no longer able interact with softphone module 204. For instance, if IT application module 205 comprises a Microsoft Office application program, integration would be lost between the Microsoft Office application program and softphone module 204. Or, if IT application module 205 comprises a web browser, a user may not be able to launch a softphone in order to dial a telephone number listed on a webpage. One should recognize that by embedding softphone 204 into VDI client end points 206, additional CPU resources will be required at the endpoint.

FIG. 3 illustrates a simplified block diagram of a system 300 that performs private registration with media relay between a VDI client 351 and a virtual machine ("VM") system 350, in accordance with an embodiment of the present invention. A local user of system 300 communicates with system 300 by use of VDI client 351. VDI client 351 includes a client softphone module 318 that provides soft phone communication functionality in VDI client 351.

System 300 provides at least the following improvements over the background art. First, it provides for all real time media to be transferred under SIP signaling and real time protocols, thereby allowing for QOS, VLAN and quality monitoring support. Second, system 300 supports a user interface inside of VM 350 and/or VDI client 351 to control calls, thus supporting click-to-call from a virtual desktop. Finally, it renders the voice and video at the endpoint, thus preserving voice and video quality of encoding all the way to the final rendering point on the desktop in the VM client machine.

Client softphone module 318 includes a SIP user application ("UA") 314. Client softphone module 318 further includes a codec module 315 that may implement a variety of audio codecs, including G.711 and G.729. Codec module 315 may also implement a variety of video codecs, including H.263, H.263+, VP8, or H.264. Client softphone module 318 further includes a GUI module 316 that manages aspects of the user interface.

VDI virtual machine server 350 may further include at least one IT application module 311. Operating system functions of VM server 350 are performed by IT application module 311 Communication channel 310 links IT application module 311 to VDI client 351, and in particular to at least one VDI thin client 322. In particular, communication channel 310 links server driver module 308 to a VDI thin client 322, and in particular to client driver module 320. Client driver module 320 may be, for instance, a Citrix™ visual receiver. VDI thin client 322 may include additional modules such as, but not limited to, a device module 319 that drives audio/visual interface 324.

VDI client 351 interfaces with a virtual machine ("VM") 350, and in particular with a SIP UA 307 within VM 350, via a SIP interface 313 and an RTP interface 312. Control and signaling is carried primarily by SIP interfaces, and real-time audio/visual data is carried primarily by the RTP interface. By convention in FIGS. 3-4, SIP interfaces are shown with a solid line and RTP interfaces are shown with a dashed line.

SIP UA 307 provides SIP back-to-back ("B2B") functionality in VM 350, in particular by interfacing with SIP UA 303 within VM 350 via a software SIP interface 306 and a software RTP interface 305. SIP UA 307 may also include a local Registrar. A Registrar is known as a server in a SIP network that accepts and processes SIP REGISTER requests. The SIP registrar provides a location service which registers one or more IP addresses to a certain SIP URI, indicated by the sip: scheme, although other protocol schemes are possible. More than one user agent can register at the same URI, with the result that all registered user agents will receive a call to the SIP URI.

SIP UA 303 provides a network interface between VM 350 and a wide area network 362 (WAN) via a SIP interface 302. The wide area network 362 in turn connects via communications channel 361 with a SIP-based communication control system 301. An example of SIP-based communication control system 301 is the Avaya Aura™ Session Manager product. Similarly, caller/callee 325 connects to the wide area network 362 via a SIP interface 326. It should be understood that caller/callee 325 may include both caller and callee functions in order to place calls to, and accept calls originating from, e.g., SIP UA 314. A separate RTP interface 327 is provided between SIP UA 303 and caller/callee 325.

Embodiments in accordance with the present invention are not limited to the networking topology and protocols illustrated and described above with respect to FIG. 3. For example, connections may be made with a caller/callee who is using other signaling protocols such as H.323 or ISDN/TDM. In these cases, a signaling and/or media gateway (not shown in FIG. 3) would be used to convert the caller/callee signaling into SIP signaling and SIP-compatible media.

A process for enabling SIP UA 314 to send and receive calls, e.g., to/from caller/callee 325, proceeds by first having the SIP UA 314 register with the SIP Registrar contained in the VM 350 via a SIP REGISTER request transmitted on SIP interface 313, and in particular to SIP UA 307. SIP UA 307 sets up a B2B session with SIP UA 303, using SIP interface 306. The SIP UA 303 registers with module 301 by use of a SIP REGISTER request transmitted on SIP interface 302 via WAN 362 and interface 361.

Once all registrations are complete, reception of an incoming call may proceed in one of two ways—either under control of user interface 316a, or under control of user interface 316b. Under control of user interface 316a, the call proceeds as follows. First, a caller such as caller/callee 325 would send a SIP: INVITE message to SIP UA 303 via SIP interfaces 326 and 302. Next, the SIP: INVITE message is sent from SIP UA 303 to SIP UA 307 via SIP interface 306. Then the SIP: INVITE message is sent from SIP UA 307 to SIP UA 314 via SIP interface 313. If the call is accepted by the user via user interface 316a, then SIP UA 314 sends a SIP: ACK message back to caller/callee 325 via SIP interfaces 313, 306, 302, and 326. Then a real-time audio/visual data stream is established between caller/callee 325 and SIP UA 314 via RTP interfaces 327, 305, and 312.

The real-time audio/visual data stream is sent in shuffled mode between caller/callee 325 and SIP UA 303, but is sent in B2B mode between SIP UA 303 and SIP UA 314.

Under control of user interface 316b, the receipt of an incoming call proceeds as follows. First, a caller such as caller/callee 325 would send a SIP: INVITE message to SIP UA 303 via SIP interfaces 326 and 302. If the user accepts the incoming call via user interface 316b, then the SIP: INVITE message is sent from SIP UA 303 to SIP UA 307 via SIP interface 306. Then the SIP: INVITE message is sent from SIP UA 307 to SIP UA 314 via SIP interface 313. If the call is either automatically accepted by SIP UA 314, or optionally if accepted by the user via user interface 316a, then SIP UA 314 sends a SIP: ACK message back to caller/callee 325 via SIP interfaces 313, 306, 302, and 326. Then a real-time audio/visual data stream is established between caller/callee 325 and SIP UA 314 via RTP interfaces 327, 305, and 312.

The placing of an outgoing call from a user of the systems 350 and 351 to caller/callee 325 proceeds similarly, either under the control of user interface 316a or 316b.

If placing of the outgoing call is under the control of user interface 316a, a SIP: INVITE message is sent to caller/callee 325 by SIP UA 314 via SIP interfaces and modules 313, 307, 306, 303, 302, WAN 362, and 326. If caller/callee 325 accepts the call, a SIP: ACK message is sent to SIP UA 314 via a reverse path through the same interfaces, modules, and WAN. Then a real-time audio/visual data stream is established between caller/callee 325 and SIP UA 314 via RTP interfaces and modules 327, 362, 303, 305, 307, and 312.

If placing of the outgoing call is under the control of user interface 316b, several methods are possible to initiate a call. A first method is for user interface 316b to request SIP UA 307 to send to SIP UA 314 via interface 313 a request to initiate a signaling and call sequence, whereupon the method proceeds as described above when the placing of the outgoing call is under the control of user interface 316a. A second method is for user interface 316b to send a request to send a SIP: INVITE message to caller/callee 325 by SIP UA 303 via SIP interfaces 302, WAN 362, and 326. Either prior, during or after this step, user interface 316b requests SIP UA 303 to send an INVITE via 306, 307, 312 to SIP UA 314, and for SIP UA 303 to associate the two sessions—and to relay messages between the two sessions thereafter. In the same way, when caller/callee 325 negotiates RTP session 327, this will be relayed by modules and interfaces 303, 305, 307, 312, 314, and codec 315. If caller/callee 325 accepts the call, a SIP: ACK message is sent to SIP UA 303 by caller/callee 325 via SIP interfaces 326, WAN 362, and SIP interface 302. When SIP UA 303 receives an ACK from SIP UA 314, it knows both 'legs' of the call are accepted, and then a real-time audio/visual data stream is established between caller/callee 325 and SIP UA 314 via RTP interfaces 327, 305, and 312.

FIG. 4 illustrates a simplified block diagram of a system 400 in accordance with an embodiment of the invention. System 400 is similar to system 300 illustrated in FIG. 3, except that system 400 performs public registration with media relay between a VDI client 451 and a virtual machine system 450, in accordance with an embodiment of the present invention. Registration of VDI client 451 is public because, as explained below, call setup is handled through WAN 362 and ASM Registrar 301 without a direct SIP registration relationship or interface between SIP UA 407 in VM 450 and SIP UA 414 in VDI client 451.

System 400 improves upon system 300 of FIG. 3 such that, that while the media and the signaling still are relayed by virtual machine 450, all of the registrations are publicly made with a public registrar. This permits full observability of the SIP interactions by a central point, in addition to network traffic monitoring of the SIP traffic that was provided by system 300.

A process for enabling a user of system 400 to send and receive calls, e.g., to/from caller/callee 325, proceeds by first having the SIP UA 414 register with ASM Registrar 301 via a SIP REGISTER request transmitted on SIP interface 429 via WAN 362 and interface 361 to Registrar 301.

Client softphone module 418 includes a SIP user application ("UA") 414. Client softphone module 418 further includes (as in FIG. 3) a codec module 315 that may implement a variety of audio and video codecs. Client softphone module 418 further includes a GUI module 416b that manages aspects of the user interface.

As in FIG. 3, VDI virtual machine server 450 of FIG. 4 may further include at least one IT application module 311. Operating system functions of VM server 450 are performed by IT application module 311 Communication channel 310 links IT application module 311 to VDI client 351, and in particular to at least one VDI thin client 322. In particular, communication channel 310 links server driver module 308 to a VDI thin client 322, and in particular to client driver module 320. Client driver module 320 may be, for instance, a Citrix™ visual receiver. VDI thin client 322 may include additional modules such as, but not limited to, a device module 319 that drives audio/visual interface 324.

VDI client 451 interfaces with a virtual machine ("VM") 450, and in particular with a SIP UA 407 within VM 450, not via a direct relationship, but rather via a relayed relationship from SIP UA 414 via a SIP interface 429 to WAN 362 to Registrar 301, and then via WAN 362 and interface 428 to SIP UA 407. Control and signaling is carried primarily by SIP interfaces, and real-time audio/visual data is carried primarily by the RTP interface. As in FIG. 3, SIP interfaces are shown with a solid line and RTP interfaces are shown with a dashed line.

SIP UA 407 provides SIP back-to-back ("B2B") functionality in VM 450, in particular by interfacing with SIP UA 403 within VM 450 via a software SIP interface 406 and a software RTP interface 405. Unlike FIG. 3, SIP UA 407 does not include a local Registrar. In some embodiments in accordance with the present invention, the logical SIP UAs 403 and 407 may be combined.

Similar to FIG. 3, SIP UA 403 provides a network interface between VM 450 and a wide area network 362 (WAN) via a SIP interface 402. The wide area network 362 in turn connects via communications channel 361 with a SIP-based communication control system 301. As in FIG. 3, caller/callee 325 connects to the wide area network 362 via a SIP interface 326.

It should be understood that caller/callee 325 may include both caller and callee functions in order to place calls to, and accept calls originating from other endpoints. A separate RTP interface 327 is provided between SIP UA 403 and caller/callee 325.

Embodiments in accordance with the present invention are not limited to the networking topology and protocols illustrated and described above with respect to FIG. 4. For example, connections may be made with a caller/callee who is using other signaling protocols such as H.323 or ISDN/TDM. In these cases, a signaling and/or media gateway (not shown in FIG. 4) would be used to convert the caller/callee signaling into SIP signaling and SIP-compatible media.

A process for enabling a user of VM 450 and VDI client 451 to send and receive calls, e.g., to/from caller/callee 325, proceeds by first having SIP UA 414, 407, and 414 register with the SIP Registrar contained in the VM 450 via a SIP REGISTER request transmitted on SIP interfaces 402, 428, and 429 respectively. As in FIG. 3, SIP UA 407 sets up a B2B session with SIP UA 403, using SIP interface 406.

Once all registrations are complete, reception of an incoming call may proceed in one of two ways—either under control of user interface 416a, or under control of user interface 416b. Under control of user interface 416a, the call proceeds as follows. As in FIG. 3, a caller such as caller/callee 325 would send a SIP: INVITE message to SIP UA 403 via SIP interfaces 326 and 402. Next, the SIP: INVITE message is sent from SIP UA 403 to SIP UA 407 via SIP interface 406. Then, in a manner different from FIG. 3, the SIP: INVITE message is sent in a relay fashion from SIP UA 407 to SIP UA 414 via SIP interface 428, WAN 362, optionally via interface 361/Registrar 301/interface 361, and then via interface 429 to SIP UA 414. If the call is accepted by the user via user interface 416a, then SIP UA 414 sends a SIP: ACK message back to caller/callee 325 via a reverse of the relay path outlined earlier in this paragraph. A real-time audio/visual data stream is established between caller/callee 325 and SIP UA 414 via a similar relay path RTP interfaces 427, SIP UA 403, interface 405, SIP UA 407, and interface 412.

Under control of user interface 416b, the receipt of an incoming call proceeds as follows. First, a caller such as caller/callee 325 would send a SIP: INVITE message to SIP UA 403 via SIP interfaces 326 and 402. If the user accepts the incoming call via user interface 316b, then similar to FIG. 3, the SIP: INVITE message is sent from SIP UA 403 to SIP UA 407 via SIP interface 406. Then, unlike FIG. 3, the SIP: INVITE message is sent in a relay fashion from SIP UA 407 to SIP UA 414 via SIP interface 428, WAN 362, optionally via interface 361/Registrar 301/interface 361, and then via interface 429 to SIP UA 414. If the call is either automatically accepted by SIP UA 414, or optionally if accepted by the user via user interface 416a, then SIP UA 414 sends a SIP: ACK message back to caller/callee 325 via a reverse of the relay path outlined earlier in this paragraph. Then a real-time audio/visual data stream is established between caller/callee 325 and SIP UA 414 via RTP interface 327, SIP UA 403, interface 405, SIP UA 407, and Interface 412.

The placing of an outgoing call from a user of VM 450 and VDI client 451 to caller/callee 325 proceeds similarly, under the control of either user interface 416a or 416b.

If under the control of UI 416a, a SIP: INVITE message is sent to caller/callee 325 by SIP UA 414 via SIP interfaces and modules 429, WAN 362, 428, 407, 406, 403, 402, WAN 362, and 326. If caller/callee 325 accepts the call, a SIP: ACK message is sent to SIP UA 414 via a reverse path through the same interfaces, modules, and WAN. Then a real-time audio/ visual data stream is established between caller/callee 325 and SIP UA 414 via RTP interfaces and modules 327, WAN 362, 403, 405, 407, and 412.

If under the control of user interface 416b, several methods are possible to initiate a call. A first method is for user interface 416b to request SIP UA 407 to send to SIP UA 414, via interface 428, WAN 362, and interface 429, a request to initiate a signaling and call sequence as described above when the placing of the outgoing call is under the control of user interface 416a. A second method is for user interface 416b to send a request to SIP UA 403 to send a SIP: INVITE message to caller/callee 325 via SIP interfaces 402, WAN 362, and 326. Either prior, during or after this step, user interface 416b requests SIP UA 403 to send an INVITE via interfaces and module 406, 407, 412 to SIP UA 414, and for SIP Module 403 to associate the two sessions—and to relay messages between the two sessions thereafter. In the same way, when callee 325 negotiates RTP session 327, this will be relayed by modules and interfaces 403, 405, 407, 412, 414, and codec 315. If caller/callee 325 accepts the call, a SIP: ACK message is sent to SIP UA 403 by caller/callee 325 via interface 326, WAN 362, and interface 402. When 403 receives a ACK from SIP UA 414 via 412, 407, and 406, it knows both 'legs' of the call are accepted, and then a real-time audio/visual data stream is established between caller/callee 325 and SIP UA 414.

Other portions of FIG. 4 not specifically discussed function similarly to like-referenced portions of FIG. 3.

FIG. 5 illustrates a simplified block diagram of a system 500 in accordance with an embodiment of the invention. System 500 is similar to system 400 of FIG. 4, except that the media is negotiated to flow directly from caller/callee 325 via RTP interface 530 as the media traverses the WAN 362 to and from SIP UA 514. Optionally, system 500 could be derived from system 300 by modifying system 300 to provide a direct media interface between caller/callee 325 and SIP UA 314. An advantage of system 500, compared to system 400 and system 300, is that by having the RTP media flow directly between caller/callee 325 and SIP UA 514, there is no need to relay streaming media through VM 450, thereby eliminating any potential contribution by VM 450 to delay and jitter onto the streaming media, and also lessening the processing load upon VM 450.

Other portions of FIG. 5 not specifically discussed function similarly to like-referenced portions of FIG. 3 and/or FIG. 4.

System 500 improves upon the background art and/or other embodiments in several ways. First, it provides for all real time media to be transferred under SIP signaling and real time protocols directly to the rendering endpoint—permitting QOS, VLAN and quality monitoring support. Second, the real time media streams bypass VM 450, and so no jitter or delay is introduced. Furthermore, the CPU processing requirements are reduced for VM 450, and so system 500 is more efficient than system 300 or system 400. All of the advantages of visibility for SIP signaling are preserved from System 400, and thus for most implementations, System 500 will be the desired architecture.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to provide session management of a real-time communication to a softphone client in a virtual machine, via a predetermined signaling protocol, comprising:
   accepting an invitation to join a session;
   receiving, by a server-based softphone in the session, a real-time communication that is encoded with at least one session aspect;
   transmitting the real-time communication and the at least one session aspect to a client-based softphone bypassing the virtual machine and directly connecting with the client-based softphone; and
   using the at least one session aspect for session management.

2. The method of claim 1, further comprising before accepting an invitation to join the session:
   registering the server-based softphone in the session with a control system; and
   privately registering the client-based softphone with the server-based softphone.

3. The method of claim 1, further comprising before accepting an invitation to join session:
   registering the server-based softphone in the session with a control system; and
   registering the client-based softphone with the control system.

4. The method of claim 1, further comprising providing a back-to-back logical network element to transmit the real-time communication and the at least one session aspect to the client-based softphone.

5. The method of claim 1, wherein transmitting the real-time communication and the at least one session aspect comprises shuffling the real-time communication to the client-based softphone.

6. The method of claim 1, wherein transmitting the real-time communication and the at least one session aspect is by use of full signaling.

7. The method of claim 1, further comprising:
   negotiating a media by use of the server-based softphone; and
   extending an identification of the negotiated media to the client-based softphone.

8. The method of claim 1, further comprising: negotiating a media by use of the client-based softphone.

9. A system to provide session management of a real-time communication to a softphone client in a virtual machine, via a predetermined signaling protocol, comprising:
   a receiver configured to accept an invitation to join a session;

a server-based softphone in the session configured to receive a real-time communication that is encoded with at least one session aspect;

a transmitter configured to transmit the real-time communication and the at least one session aspect to a client-based softphone bypassing the virtual machine and directly connecting with the client-based softphone; and a session manager configured to use the at least one session aspect for session management.

10. The system of claim 9, further comprising:

a server-based module configured to register the server-based softphone in the session with a control system; and a client-based module configured to privately register the client-based softphone with the server-based softphone.

11. The system of claim 9, further comprising:

a server-based module configured to register the server-based softphone in the session with a control system; and a client-based module configured to register the client-based softphone with the control system.

12. The system of claim 9, further comprising a back-to-back logical network element configured to transmit the real-time communication and the at least one session aspect to the client-based softphone.

13. The system of claim 9, wherein the transmitter comprises a module configured to shuffle the real-time communication to the client-based softphone.

14. The system of claim 9, wherein the transmitter is configured to transmit the real-time communication and the at least one session aspect by use of full signaling.

15. The system of claim 9, further comprising an interface to a communication channel configured to carry signaling communication separate from the real-time communication.

16. The system of claim 9, further comprising:

a negotiation module configured to negotiate a media by use of the server-based softphone, wherein an identification of the negotiated media is extended to the client-based softphone.

17. The system of claim 9, further comprising: a negotiation module configured to negotiate a media by use of the client-based softphone.

18. A system to provide session management of a real-time communication to a softphone client in a virtual machine, via a predetermined signaling protocol, comprising:

a processor;

a memory coupled to the processor, the memory configured to store software that, when executed by the processor, performs the steps of:

accepting an invitation to join a session;

receiving, by a server-based softphone in the session, a real-time communication that is encoded with at least one session aspect;

transmitting the real-time communication and the at least one session aspect to a client-based softphone bypassing the virtual machine and directly connecting with the client-based softphone; and using the at least one session aspect for session management.

19. The system of claim 18, wherein the memory is further configured to store software that, when executed by the processor, performs the step of:

providing a back-to-back logical network element to transmit the real-time communication and the at least one session aspect to the client-based softphone.

20. The method of claim 1, wherein the predetermined signaling protocol is selected from the group consisting of SIP, H.323 and ISDN/TDM.

21. The method of claim 9, wherein the predetermined signaling protocol is selected from the group consisting of SIP, H.322 and ISDN/TDM.

22. The method of claim 18, wherein the predetermined signaling protocol is selected from the group consisting of SIP, H.323 and ISDN/TDM.

* * * * *

UNITED STATES PATENT AND TRADEMARK OFFICE
CERTIFICATE OF CORRECTION

| | |
|---|---|
| PATENT NO. | : 9,094,420 B2 |
| APPLICATION NO. | : 13/351301 |
| DATED | : July 28, 2015 |
| INVENTOR(S) | : Valentine C. Matula et al. |

It is certified that error appears in the above-identified patent and that said Letters Patent is hereby corrected as shown below:

On the title page, in the illustrative figure "Public registration, media relay" should read -- Public registration: media shuffle --.

In the Drawings:

The title of Figure 5, "Public registration, media relay" should read, -- Public registration: media shuffle --.

Signed and Sealed this
Twenty-ninth Day of December, 2015

Michelle K. Lee
*Director of the United States Patent and Trademark Office*